US010023224B2

(12) United States Patent
An et al.

(10) Patent No.: US 10,023,224 B2
(45) Date of Patent: Jul. 17, 2018

(54) COWL CROSS MEMBER FOR VEHICLE

(71) Applicants:Hyundai Motor Company, Seoul (KR); Kia Motors Corporation, Seoul (KR)

(72) Inventors: Jae Hyun An, Chungcheongnam-do (KR); Jung Yoon Jang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 53 days.

(21) Appl. No.: 15/186,909

(22) Filed: Jun. 20, 2016

(65) Prior Publication Data

US 2017/0057538 A1 Mar. 2, 2017

(30) Foreign Application Priority Data

Aug. 27, 2015 (KR) ........................ 10-2015-0120767

(51) Int. Cl.
  *B62D 25/14* (2006.01)
  *B62D 1/19* (2006.01)
(52) U.S. Cl.
  CPC ........... *B62D 1/197* (2013.01); *B62D 25/145* (2013.01)
(58) Field of Classification Search
  CPC ...................................................... B62D 1/197
  USPC ....................................................... 296/192
  See application file for complete search history.

(56) References Cited

U.S. PATENT DOCUMENTS

| 6,860,547 | B2 * | 3/2005 | Winter | B62D 21/155 |
| | | | | 180/90 |
| 7,604,278 | B2 * | 10/2009 | Penner | B60K 37/00 |
| | | | | 180/90 |
| 9,132,865 | B2 * | 9/2015 | Chung | B62D 25/04 |
| 2010/0171339 | A1 * | 7/2010 | Zornack | B62D 65/02 |
| | | | | 296/193.02 |
| 2015/0344080 | A1 * | 12/2015 | Davos | B62D 29/001 |
| | | | | 296/205 |
| 2017/0158247 | A1 * | 6/2017 | Hwang | B62D 25/081 |

FOREIGN PATENT DOCUMENTS

| DE | 19537408 C1 | 12/1996 |
| DE | 19728557 A1 | 1/1998 |
| EP | 0479630 A1 | 4/1992 |
| EP | 1467114 A1 | 10/2004 |
| EP | 1574422 A1 | 9/2005 |
| JP | 2006-027609 A | 2/2006 |
| JP | 5271406 B2 | 8/2013 |
| KR | 2005-0105595 A | 11/2005 |
| KR | 2006-0005787 A | 1/2006 |
| KR | 2006-0016405 A | 2/2006 |
| KR | 2008-0010523 A | 1/2008 |
| WO | WO 2004090369 A1 * | 10/2004 ............. B62D 21/15 |

* cited by examiner

*Primary Examiner* — Pinel E Romain
(74) *Attorney, Agent, or Firm* — Mintz Levin Cohn Ferris Glovsky and Popeo, P.C.; Peter F. Corless

(57) ABSTRACT

A cowl cross member for a vehicle is provided. The cowl cross member includes a cowl cross bar that has first and second ends fixed to an interior panel of a front pillar of the vehicle and is disposed in a horizontal direction at a front side of a vehicle body, with a steering column fixed thereto. A center support is vertically disposed to support a central portion of the cowl cross bar to couple the cowl cross bar at a predetermined height and is configured to adjust a length of the center support during a vehicle collision.

7 Claims, 8 Drawing Sheets

COWL CROSS MEMBER FOR VEHICLE

CROSS-REFERENCE TO RELATED APPLICATION

This application claims under 35 U.S.C. § 119(a) the benefit of Korean Patent Application No. 10-2015-0120767 filed on Aug. 27, 2015, the entire contents of which are incorporated herein by reference.

BACKGROUND (a) Technical Field

The present disclosure relates to a cowl cross member for a vehicle and more particularly, to a cowl cross member for a vehicle which has a column dive prevention structure.

(b) Background Art

Generally, a cowl cross member is installed in parallel with a vehicle body to improve strength or rigidity of the vehicle body and prevent the integrity of the vehicle body from being compromised in various directions (e.g., twisted or bent in front, rear, left and right directions). The cowl cross member couples a steering system to the vehicle body at a boundary disposed between an engine compartment of the vehicle and an interior passenger compartment of the vehicle body, and supports a duct of system for cooling, heating, and air conditioning.

In particular, the cowl cross member includes a cowl cross bar that serves as a reinforcing bar to support an instrument panel, and the cowl cross bar inhibits a dash panel, which constitutes electrical components and the vehicle body, from entering the interior passenger compartment of the vehicle to improve the safety for the passengers. The cowl cross bar is mounted between the dash panel and the engine room. For example, a steering shaft support unit is fixedly fastened to the cowl cross bar, and a pair of center supports, which has a predetermined length, is vertically disposed at a central portion of the cowl cross bar to fix the cowl cross bar to the floor of the vehicle.

Since the center support is fixedly and integrally coupled to the floor of the vehicle, the center support translates downward together with the floor of the vehicle when the floor moves downward in a vertical direction during a vehicle collision, and as a result, a column dive phenomenon occurs. Therefore, as illustrated in FIG. 1, a steering system supported by the cowl cross bar is bent at a predetermined angle and generates a difference of about 50 mm. Accordingly, as a result, the steering system is bent by a predetermined angle M, and a deployment direction of an airbag cannot be ensured. The steering system causes an increase in the likelihood of an injury to an upper body of a passenger.

The above information disclosed in this section is merely for enhancement of understanding of the background of the invention and therefore it may contain information that does not form the prior art that is already known in this country to a person of ordinary skill in the art.

SUMMARY

The present invention provides a cowl cross member for a vehicle, in which a center support disposed on a cowl cross bar includes multiple stages. For example, the center support may have a length that may be configured to extend via a sliding movement of the center support during a vehicle collision, and may prevent a column dive phenomenon.

In one aspect, the present invention may include a cowl cross bar which has first and second ends coupled to an interior panel of a front pillar of the vehicle, and may be disposed in a horizontal direction at a front side of a vehicle body that may include a steering column coupled thereto. A center support may be vertically disposed to support a central portion of the cowl cross bar to fix the cowl cross bar a predetermined height, and may be configured to adjust a length of the center support in the event of a vehicle collision.

In an exemplary embodiment, the center support may include a sliding guide coupled to a central portion of the cowl cross bar and having a coupling space formed therein. Further, a center slide supporter may include a first end coupled to the coupling space via a rail. The second end may be coupled to a mounting bracket disposed on the floor of the vehicle. Additionally, slides may be disposed within the sliding guide may be displaced in a downward direction when the floor moves downward in the event of a vehicle collision. In some exemplary embodiment, the sliding guide may include a pair of guide mounts spaced apart from each other within the coupling space in a vertical direction. The center slide supporter may include a withdrawal aperture and a sliding aperture that may be positioned in the vertical direction, and may be fixed at an initial position by coupling a fastening member when the guide mounts are inserted into the withdrawal aperture and the sliding aperture.

In addition the sliding aperture may include a first slot with a width that may be greater than a diameter of the guide mount, and a sliding range of the center slide supporter based on a length. A second slot may include a diameter that corresponds to the diameter of the guide mount and may prevent rotation of the center slide supporter from an initial position. The withdrawal aperture may be opened at one end of the center slide supporter and the center slide supporter slides may be configured to translate (e.g., slide) to withdraw the guide mount. In another preferred embodiment, the sliding guide may include a support retaining portion disposed between the pair of guide mounts and may support the center slide supporter at the initial position.

In a further exemplary embodiment, the support retaining portion may include a support protrusion member that may extend to the exterior by penetrating the sliding aperture at the initial position and may intersect (e.g., capture) the center slide supporter. Further, the support protrusion member may be bent in a right angle (e.g., '¬') shape at a first side of the support retaining portion, and a bent region may be rounded. The support retaining portion may be formed to increase surface rigidity, and may be coupled to the sliding guide.

In the present invention, the center support, disposed on the cowl cross bar, may be configured to laterally translate to extend a length of the center support during a vehicle collision, and as a result, may prevent a column dive phenomenon. Due to the prevention of the column dive phenomenon, the present invention may provide a specific deployment direction of an airbag and may accordingly reduce an injury to an upper body of a passenger. As a result, stable performance regarding collision may be provided.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
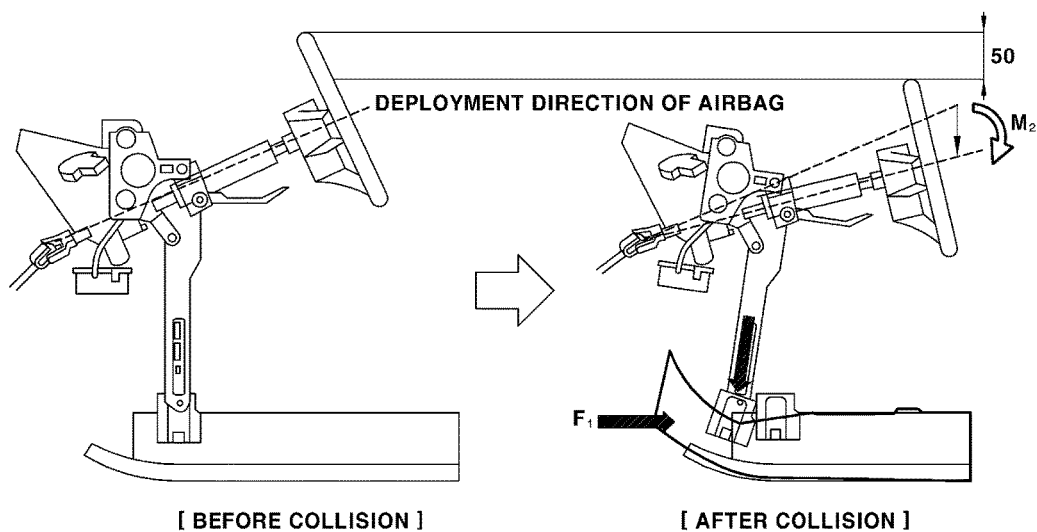
FIG. 1 is an exemplary view illustrating a cowl cross member for a vehicle in the related art before and after a collision according to the related art.

Reference numerals set forth in the Drawings includes reference to the following elements as further discussed below:

100: mounting bracket
200: center support
210: sliding guide
212, 214: guide mount
216: support retaining portion
216a: support protrusion member
220: center slide supporter
222: withdrawal aperture
224: sliding aperture
224a: first slot
224b: second slot
300: fastening member It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, the exemplary embodiment of the present invention will be described in detail with reference to the accompanying drawings. Advantages and features of the present invention and methods of achieving the advantages and features will be clear with reference to the exemplary embodiments described in detail below together with the accompanying drawings.

However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. In the description of the present invention, a detailed explanation of publicly known related technologies may be omitted so as to avoid unnecessarily obscuring the subject matter of the present invention.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Figure 2:
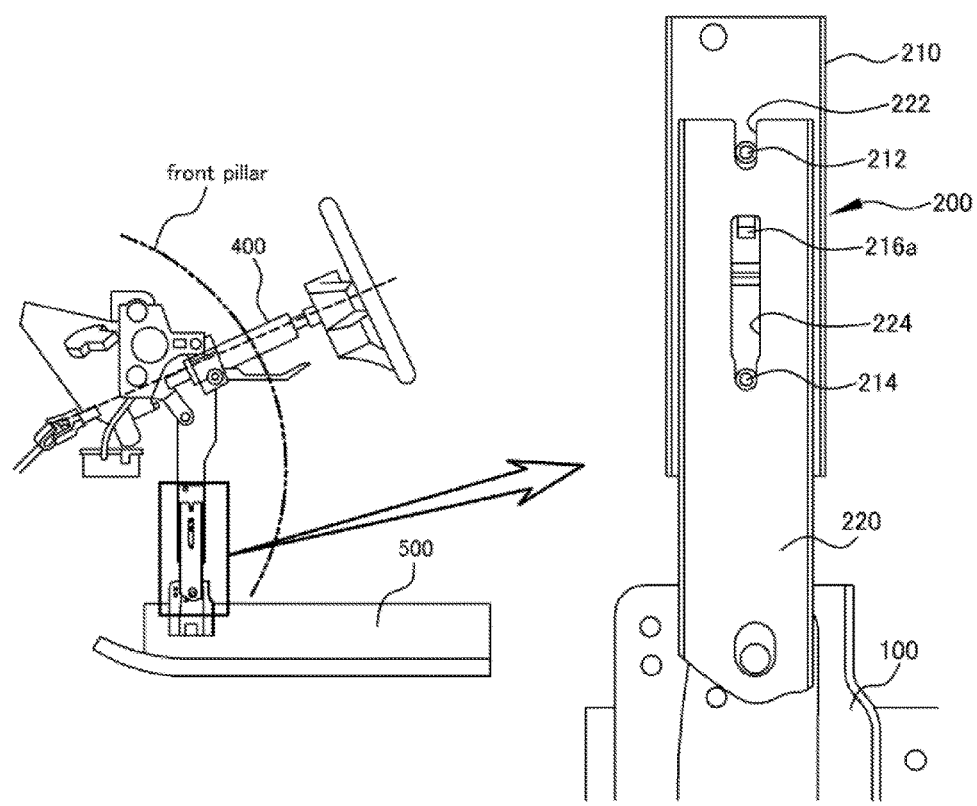
FIG. 2 is an exemplary view schematically illustrating a cowl cross member for a vehicle according to an exemplary embodiment of the present invention before a collision.
Figure 3:
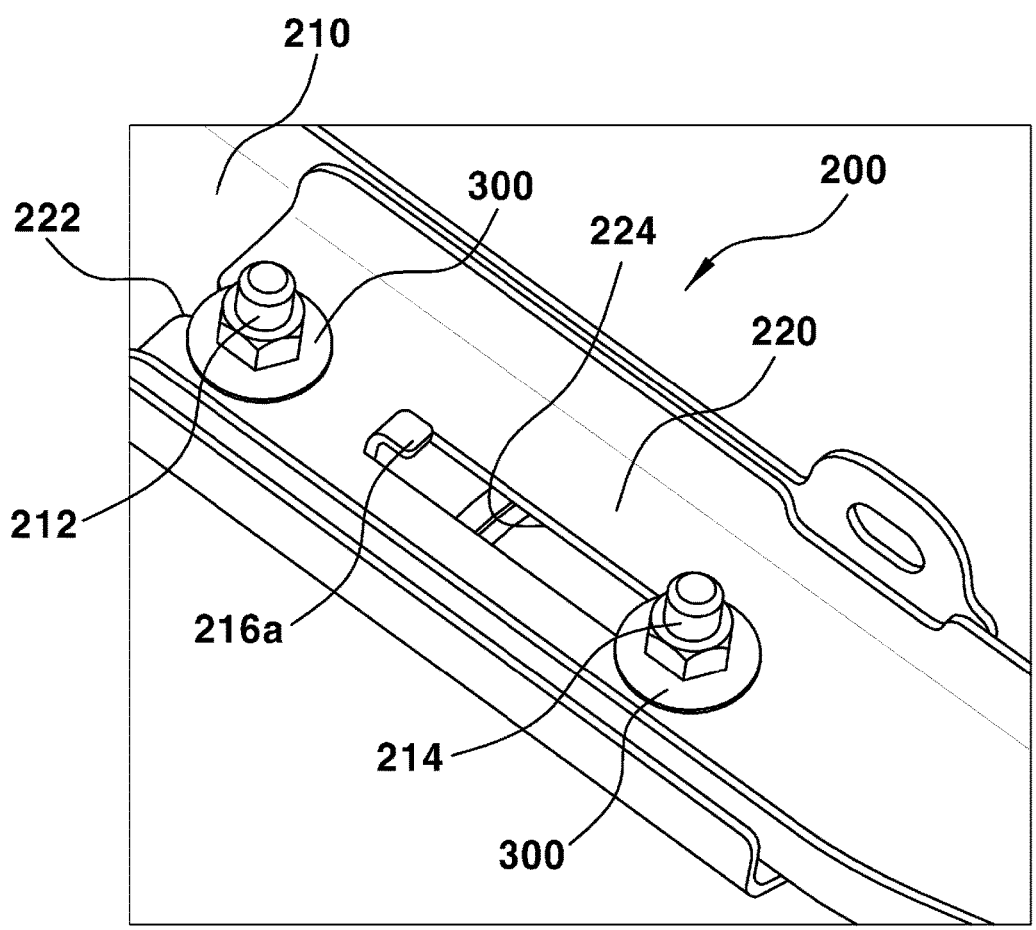
FIG. 3 is an exemplary perspective view illustrating the cowl cross member for a vehicle according to the exemplary embodiment of the present invention before a collision.
Figure 4:
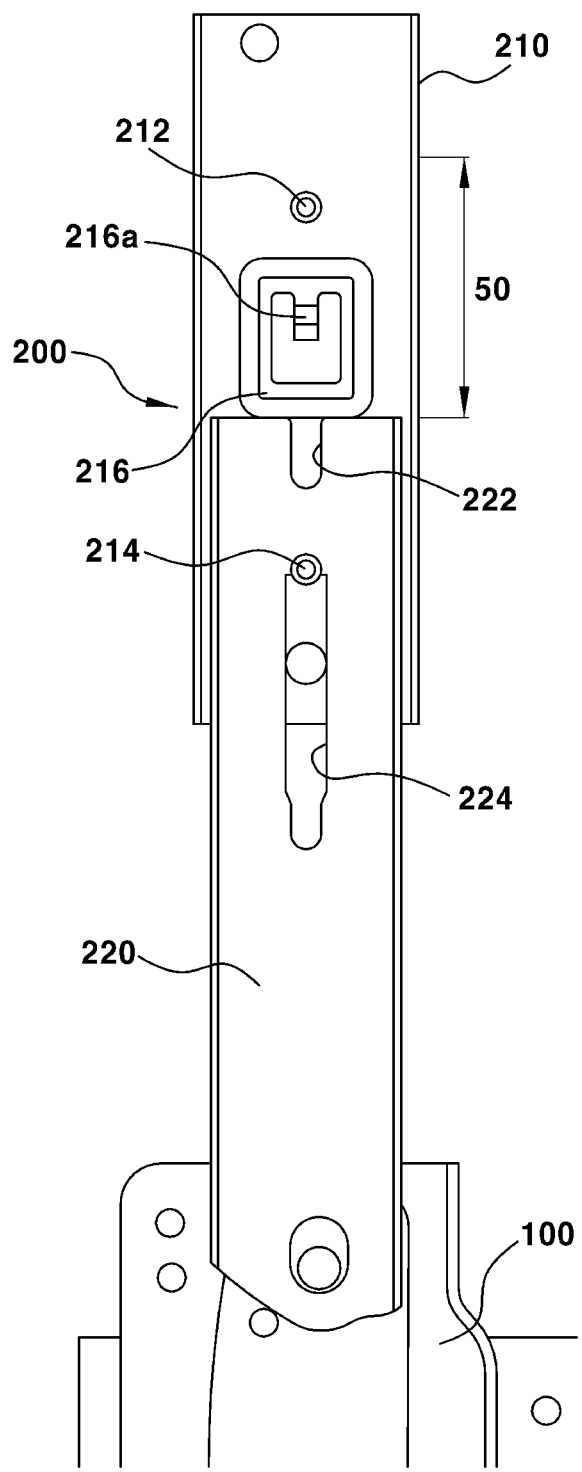
FIG. 4 is an exemplary view schematically illustrating the cowl cross member for a vehicle according to the exemplary embodiment of the present invention after a collision.
Figure 5:
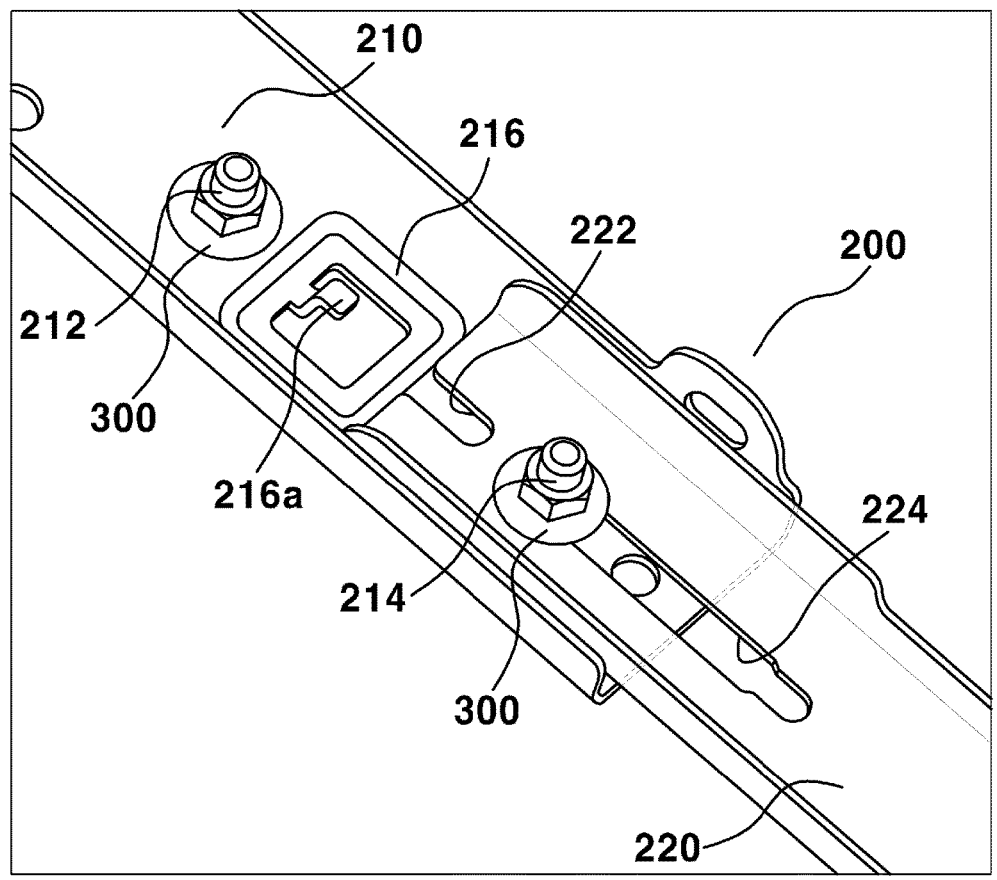
FIG. 5 is an exemplary perspective view illustrating the cowl cross member for a vehicle according to the exemplary embodiment of the present invention after a collision.

FIG. 2 is an exemplary view schematically illustrating a cowl cross member for a vehicle according to an exemplary embodiment of the present invention before a collision. FIG. 3 is an exemplary perspective view illustrating the cowl cross member for a vehicle according to the exemplary embodiment of the present invention before a collision. FIG. 4 is an exemplary view schematically illustrating the cowl cross member for a vehicle according to the exemplary embodiment of the present invention after a collision. FIG. 5 is an exemplary perspective view illustrating the cowl cross member for a vehicle according to the exemplary embodiment of the present invention after a collision.

A cowl cross member for a vehicle according to the present invention may include a cowl cross bar and a center support 200. A first end and a second end of the cowl cross bar may be fixed to an interior panel of a front pillar of the vehicle. In particular, the cowl cross bar may be disposed in a horizontal direction at a front side of a vehicle body and a steering column may be fixed to the cowl cross bar. Since the cowl cross bar according to the present invention has a general structure and shape, a specific description thereof will be omitted.

The center support 200 may support a central portion of the cowl cross bar to couple the cowl cross bar at a predetermined height and a pair of center supports 200 may be vertically disposed. The center support 200 according to an exemplary embodiment may be configured to adjust a length of the center support 200 during a vehicle collision. Namely, the center support 200 may include a sliding guide 210 and a center slide supporter 220 as illustrated in FIGS. 1 to 4. The sliding guide 210 may be coupled to the central portion of the cowl cross bar and may have a predetermined length and a coupling space may be formed within the sliding guide 210. A pair of guide mounts 212 and 214 may be spaced apart from each other in a vertical direction within the coupling space and may be disposed on the sliding guide 210. The slide guide 210 may include a support retaining portion 216 disposed between the pair of guide mounts 212 and 214 and may be configured to support the center slide supporter 220 at an initial position.

The support retaining portion 216 may include a support protrusion member 216a which, at an initial position, may extend to the exterior by penetrating through a sliding aperture 224 formed in the center slide supporter 220, and may capture the center slide supporter 220. For example, an upper portion of a first end of the support protrusion member 216a may extend from the support retaining portion 216 and may be configured to support the center slide supporter 220 to maintain the initial position of the center slide supporter 220. A first end of the center slide supporter 220 may be coupled within the coupling space of the slide guide 210 via a rail and a second end of the center slide supporter 220 may be fixedly coupled to a mounting bracket 100 disposed on the floor of the vehicle.

During a vehicle collision, the vehicle floor may be displaced in a downward direction and the center slide supporter 220 may be configured to slide within the sliding guide 210 by the downward movement of the mounting bracket 100. In other words, in the event of a vehicle collision, the floor may be displaced in a downward direction by the impact. Accordingly, the mounting bracket 100 may be displaced in a downward direction in conjunction with the floor of the vehicle and the center slide supporter 220 may be configured to be displaced downward in the vertical direction.

In particular, the center slide supporter 220 may be integrally coupled to the cowl cross bar and the center slide supporter 220 may be configured to displace the cowl cross bar in a downward direction when the floor is displaced in a downward direction during a vehicle collision. Accordingly, an installation angle of the steering column fixed to the cowl cross bar may be configured to be adjusted. Therefore, a deployment direction of an airbag may not be ensured due to a change in an installation angle of the steering column, which may consequently cause an increase in injuries to an upper body of a passenger. Conversely, in the exemplary embodiment, the center slide supporter 220 may be slidably coupled to the sliding guide 210 and a length of about 30 mm may be compensated at the time of a vehicle collision to provide more stable performance in the event of a vehicle collision.

Moreover, the center slide supporter 220 may include with a withdrawal aperture 222 and a sliding aperture 224 disposed in the vertical direction. As shown in FIG. 3, the center slide supporter 220 may be fixed at the initial position by coupling fastening members 300 when the guide mounts 212 and 214 are inserted into the withdrawal aperture 222 and the sliding aperture 224, respectively. For example, the slide supporter 220 may be configured to slide within a sliding range. In particular, the sliding aperture 224 may have a predetermined length and the guide mount 214 may be captured (e.g., intersected) by an end of the sliding aperture 224.

The withdrawal aperture 222 may be opened at a first end of the center slide supporter opposite to the sliding direction and the slide supporter 220 may be configured to slide and may thereby withdraw the guide mount 212. The sliding movement of the center slide supporter 220 according to the exemplary embodiment of the present invention will be sequentially described below with reference to FIGS. 1 to 4.

In the event of a vehicle collision, the floor may be displaced in a downward direction and the mounting bracket 100 may also be displaced in a downward direction. In particular, the center slide supporter 220 may be fixedly coupled to the mounting bracket 100 and may be configured to slide a distance that corresponds to a length of the sliding aperture 224 formed in the center slide supporter 220, and may be displaced in a downward direction of about 50 mm from the initial position. In other words, a load, which occurs due to instantaneous force caused by a vehicle collision may be exerted on the support protrusion member 216a. The center slide supporter 220 may be configured to slide while being withdrawn from the support protrusion member 216a, and the support protrusion member 216a may be deformed under a predetermined load.

The guide mount 214 may be captured by an end of the sliding aperture 224 upon movement (e.g., sliding) of the center slide supporter 220. Accordingly, the sliding movement of the center slide supporter 220 may be restricted. In particular, when the center slide supporter 220 slides within the restricted range as described above, a length of about 30 mm may be compensated during a vehicle collision. In other words, a column dive phenomenon of the steering column may be prevented and may reduce an injury to an upper body of a passenger may be reduced by ensuring a deployment direction of an airbag.

Figure 6:
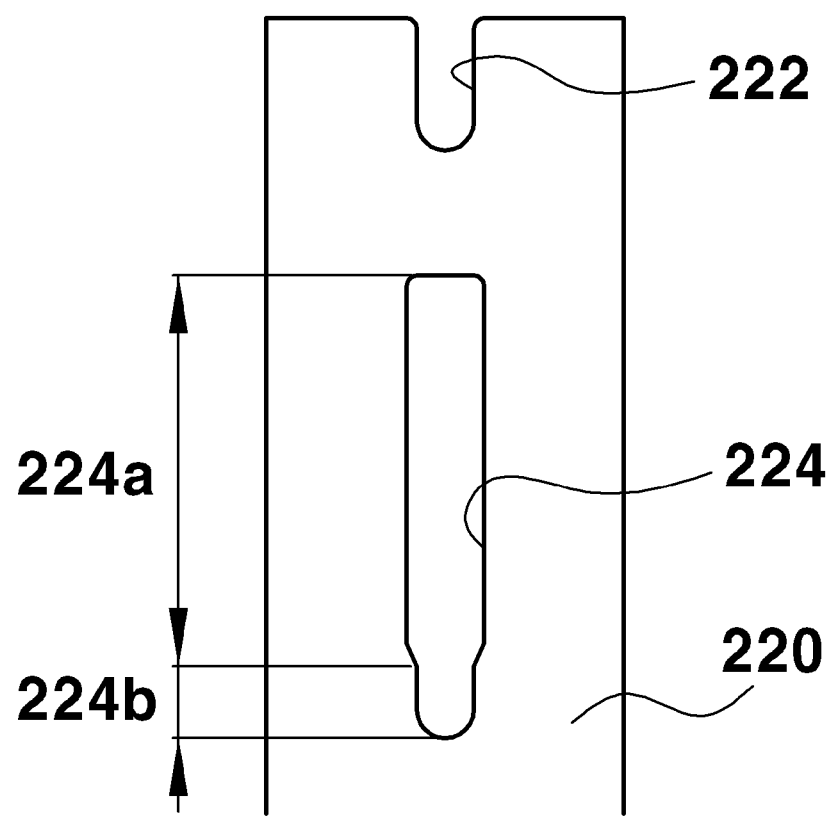
FIG. 6 is an exemplary view illustrating a center slide supporter of the cowl cross member for a vehicle according to the exemplary embodiment of the present invention.

FIG. 6 is an exemplary view illustrating the center slide supporter of the cowl cross member for a vehicle according to the exemplary embodiment of the present invention. As illustrated in FIG. 6, the center slide supporter 220 may include the withdrawal aperture 222 and the sliding aperture 224 disposed in the vertical direction. Further, the center slide supporter 220 may be fixed at the initial position by coupling the fastening members 300 when the guide mounts 212 and 214 are inserted into the withdrawal aperture 222 and the sliding aperture 224.

For example, the sliding aperture 224 may include a first slot 224a and a second slot 224b. The first slot 224a may have a width greater than a diameter of the guide mount 214 and may be configured to set a sliding range of the center slide supporter 220 based on a length. In particular, the center slide supporter 220 may be damaged due to friction caused by the sliding movement of the center slide supporter 220 when a width of the first slot 224a is equal to the diameter of the guide mount 214. The second slot 224b may have a diameter that corresponds to the diameter of the guide mount 214. Accordingly, the center slide supporter 220 may be prevented from being rotated at the initial position. In other words, the second slot 224b may be formed as a Y-shaped slot having a width that decreases from the first slot 224a. Accordingly, the second slot 224b may prevent the center slide supporter 220 from being rotated at the initial position before a vehicle collision and may inhibit a gap formed between the second slot 224b and the guide mount 214.

Figure 7:
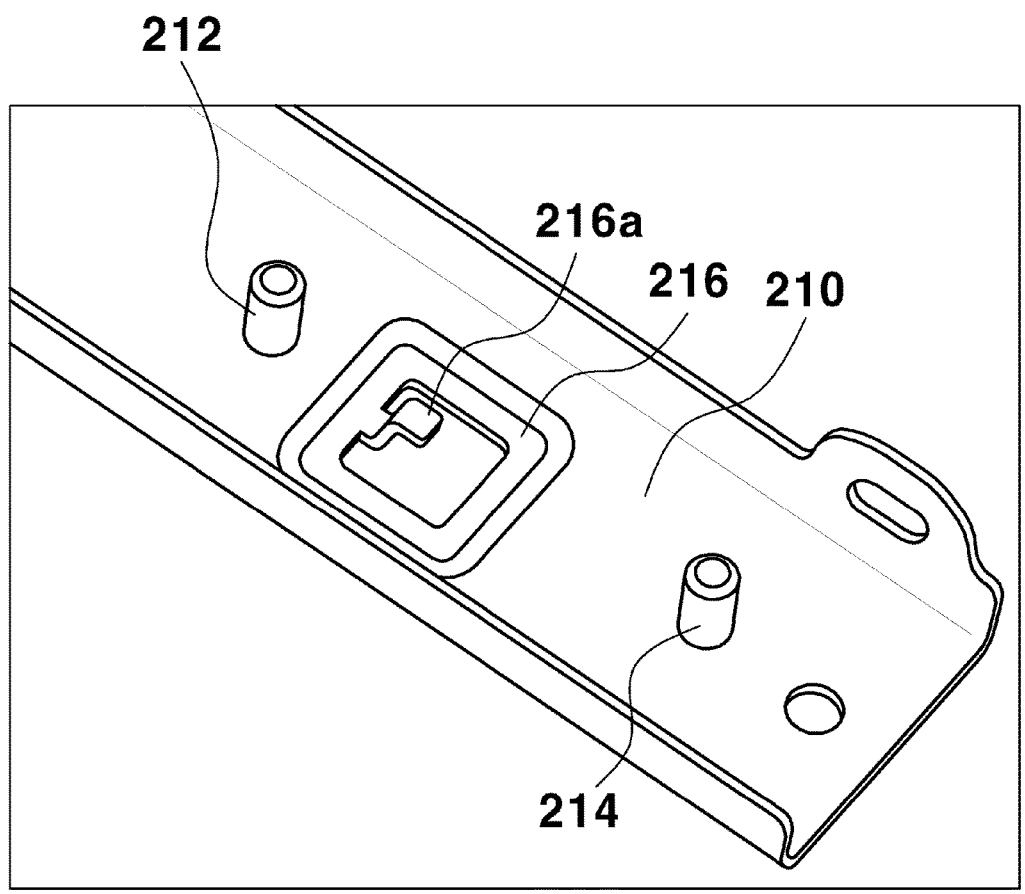
FIG. 7 is an exemplary view illustrating a front side of a support retaining portion of the cowl cross member for a vehicle according to the exemplary embodiment of the present invention.
Figure 8:
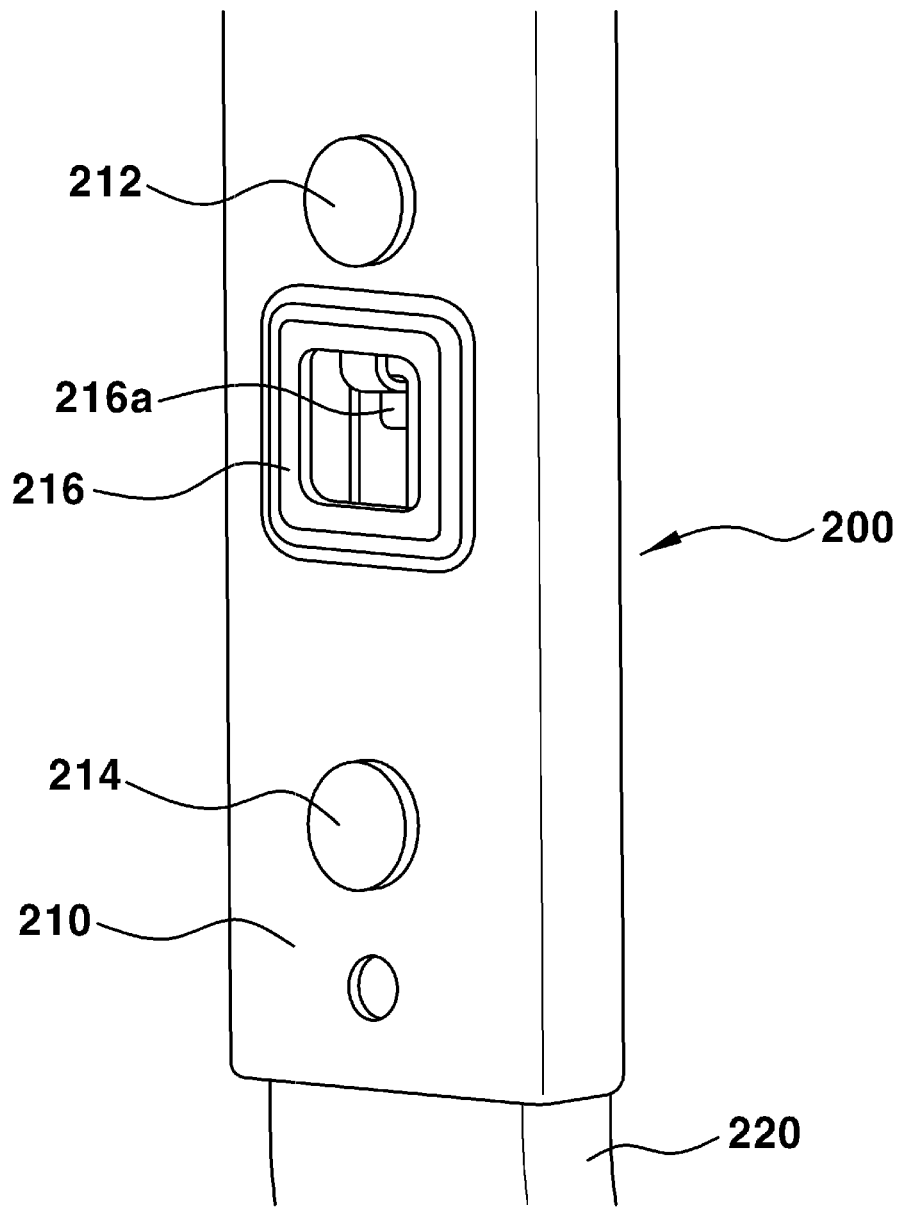
FIG. 8 is an exemplary view illustrating a rear side of the support retaining portion of the cowl cross member for a vehicle according to the exemplary embodiment of the present invention.

FIG. 7 is an exemplary view illustrating a front side of the support retaining portion of the cowl cross member for a vehicle according to the exemplary embodiment of the present invention. FIG. 8 is an exemplary view illustrating a rear side of the support retaining portion of the cowl cross member for a vehicle according to the exemplary embodiment of the present invention. As illustrated in FIGS. 7 and 8, the slide guide 210 may include the support retaining portion 216 disposed between the pair of guide mounts 212 and 214 and may be configured to support the center slide supporter 220 at the initial position.

The support retaining portion 216 may include the support protrusion member 216a that extends to the exterior by penetration of the sliding aperture 224 and may capture the center slide supporter 220. The support protrusion member 216a may form a right angle shape (e.g., bent in '¬' shape) at a first side of the support retaining portion 216, and a bent region may be rounded.

The rounded shape of the bent region may be desirable since the center slide supporter 220 slides along with the bent region upon exertion of a load on the support protrusion member 216a due to instantaneous force caused by a vehicle collision. For example, deformation under a predetermined load may cause the center slide supporter 220 to slide, and then decouple (e.g., separate) from the support protrusion member 216a. In other words, the support retaining portion 216 may be coupled by surface rigidity and the support protrusion member 216a may be locally deformed when a portion except for the support protrusion member 216a is coupled to the sliding guide 210. In particular, the support retaining portion 216 may be formed to increase surface rigidity and coupled to the sliding guide 210. In other words, the support retaining portion 216 may be prevented from being damaged by deformation of the support protrusion member 216a when a load is exerted on the support protrusion member 216a while the center slide supporter 220 slides.

In the present invention, the center support, installed on the cowl cross bar, may include multiple stages configured to extend a length of the the center support by a sliding movement during a vehicle collision. Accordingly a column dive phenomenon may be prevented. Therefore, the present invention may reduce an injury to an upper body of a passenger by ensuring a deployment direction of an airbag by preventing a column dive phenomenon, and may provide more stable performance during a collision.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A cowl cross member for a vehicle, comprising:
a cowl cross bar having first and second ends fixed to an interior panel of a front pillar of the vehicle, disposed in a horizontal direction at a front side of a vehicle body, and fixed to a steering column; and
a center support vertically disposed to support a central portion of the cowl cross bar fixed at a predetermined height, and configured to adjust a length of the center support during a vehicle collision,
wherein the center support includes:
a sliding guide coupled to the central portion of the cowl cross bar and includes a coupling space formed therein; and
a center slide supporter which has a first end coupled to the coupling space by a rail, and a second end fixedly coupled to a mounting bracket disposed on a floor of the vehicle, and is configured to slide in the sliding guide when the floor moves downward during a vehicle collision,
wherein the sliding guide includes a pair of guide mounts spaced apart from each other in the coupling space in a vertical direction, and
wherein the center slide supporter includes a withdrawal aperture and a sliding aperture installed in the vertical direction, and fixed at an initial position by coupling a fastening member when the guide mounts are inserted into the withdrawal aperture and the sliding aperture.

2. The cowl cross member of claim 1, wherein the sliding aperture includes:
a first slot that has a width greater than a diameter of the guide mount, and a sliding range of the center slide supporter is set based on a length; and
a second slot that has a diameter that corresponds to the diameter of the guide mount, and is configured to obstruct the center slide supporter from being rotated at the initial position.

3. The cowl cross member of claim 1, wherein the withdrawal aperture is opened at a first end of the center slide supporter and the guide mount is configured to be withdrawn upon translation of the center slide supporter.

4. The cowl cross member of claim 1, wherein the sliding guide includes a support retaining portion disposed between the pair of guide mounts and is configured to support the center slide supporter at the initial position.

5. The cowl cross member of claim 4, wherein the support retaining portion includes a support protrusion member that extends to the exterior by penetrating the sliding aperture at the initial position and captures the center slide supporter.

6. The cowl cross member of claim 5, wherein the support protrusion member is bent in a right angled shape at a first side of the support retaining portion, and a bent region is rounded.

7. The cowl cross member of claim 4, wherein the support retaining portion is formed to increase surface rigidity, and is coupled to the sliding guide.

* * * * *